Figure 1:
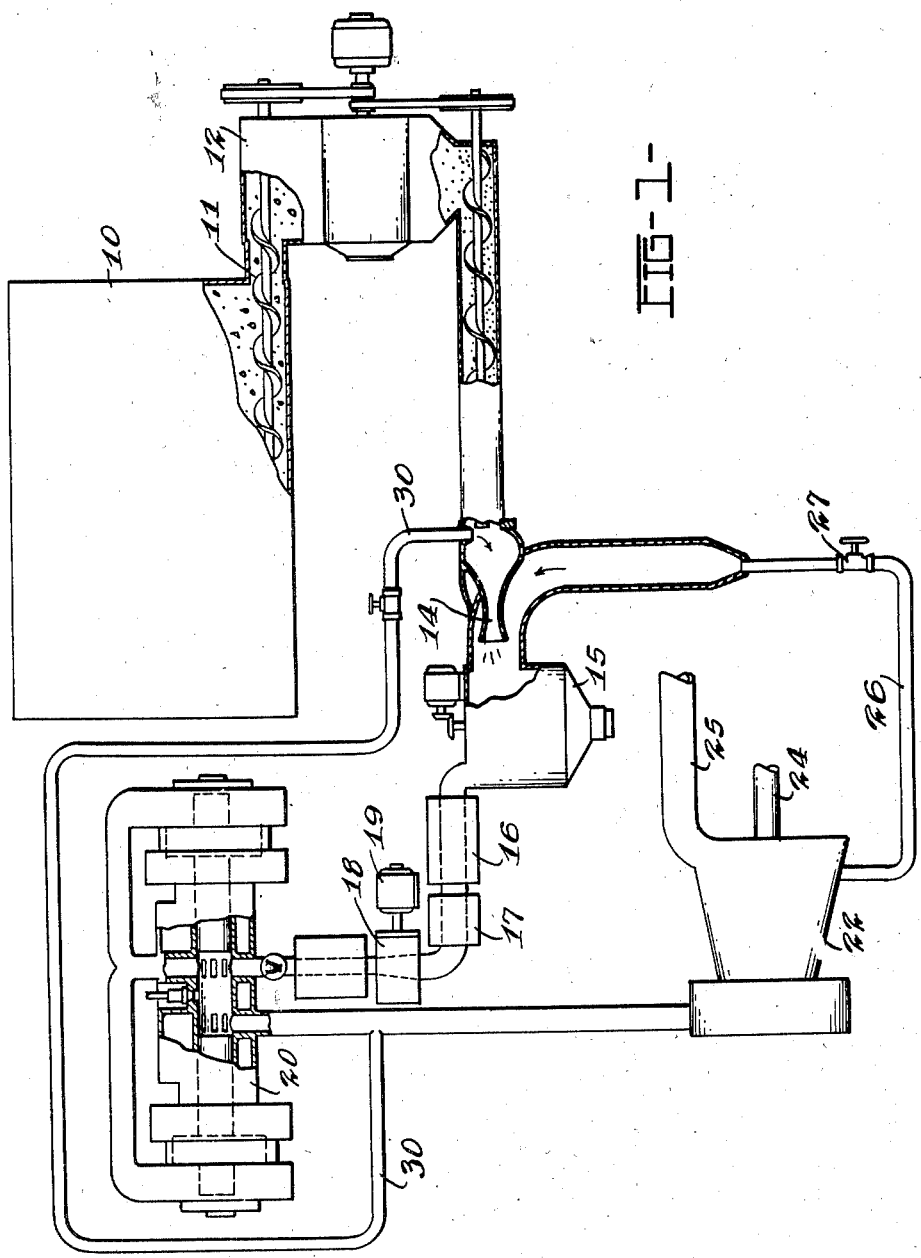

May 30, 1950 — R. P. RAMSEY — 2,509,246

MEANS FOR DERIVING ENERGY FROM SOLID FUELS

Filed Sept. 20, 1946 — 3 Sheets-Sheet 1

INVENTOR.
ROBERT P. RAMSEY
BY
Attorneys

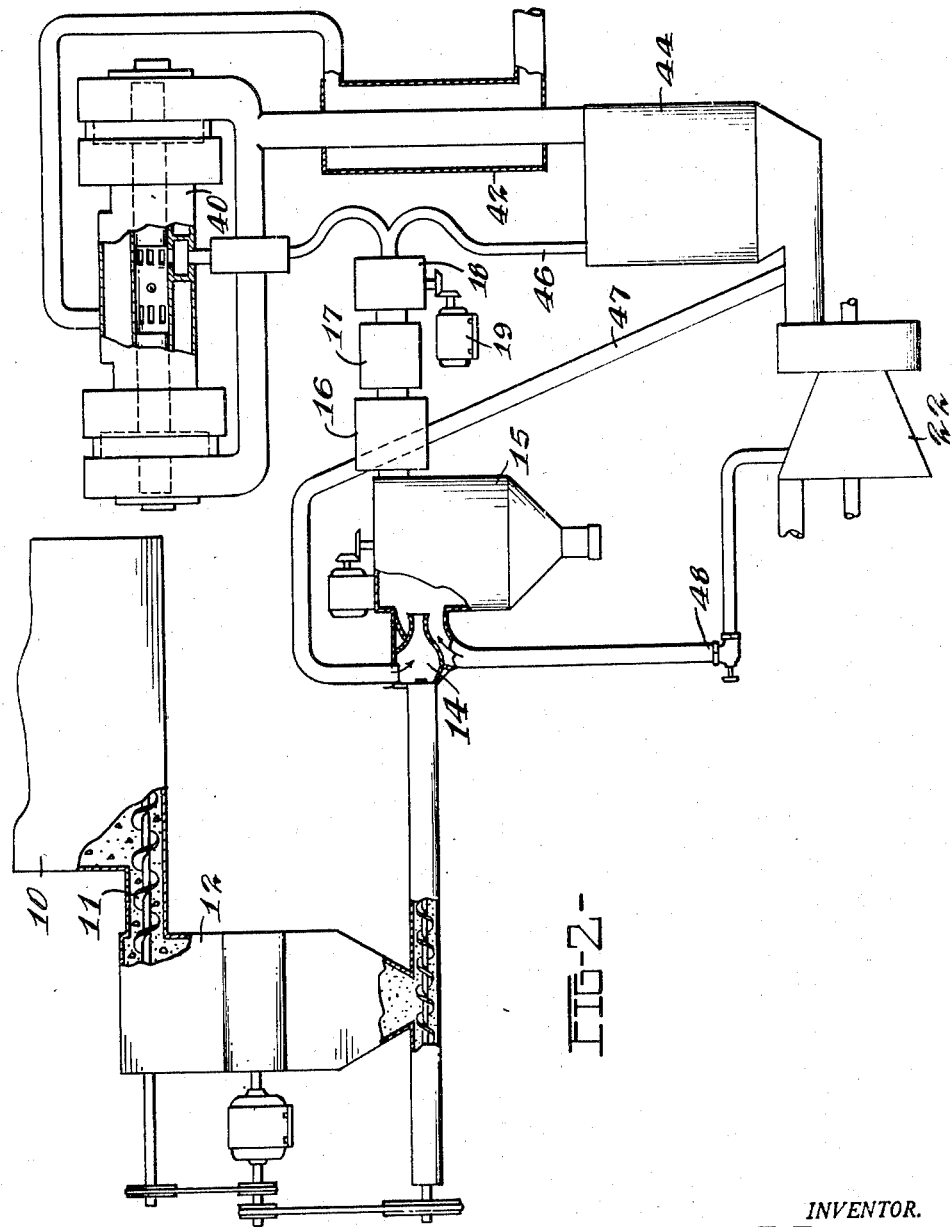

May 30, 1950 R. P. RAMSEY 2,509,246
MEANS FOR DERIVING ENERGY FROM SOLID FUELS
Filed Sept. 20, 1946 3 Sheets-Sheet 3
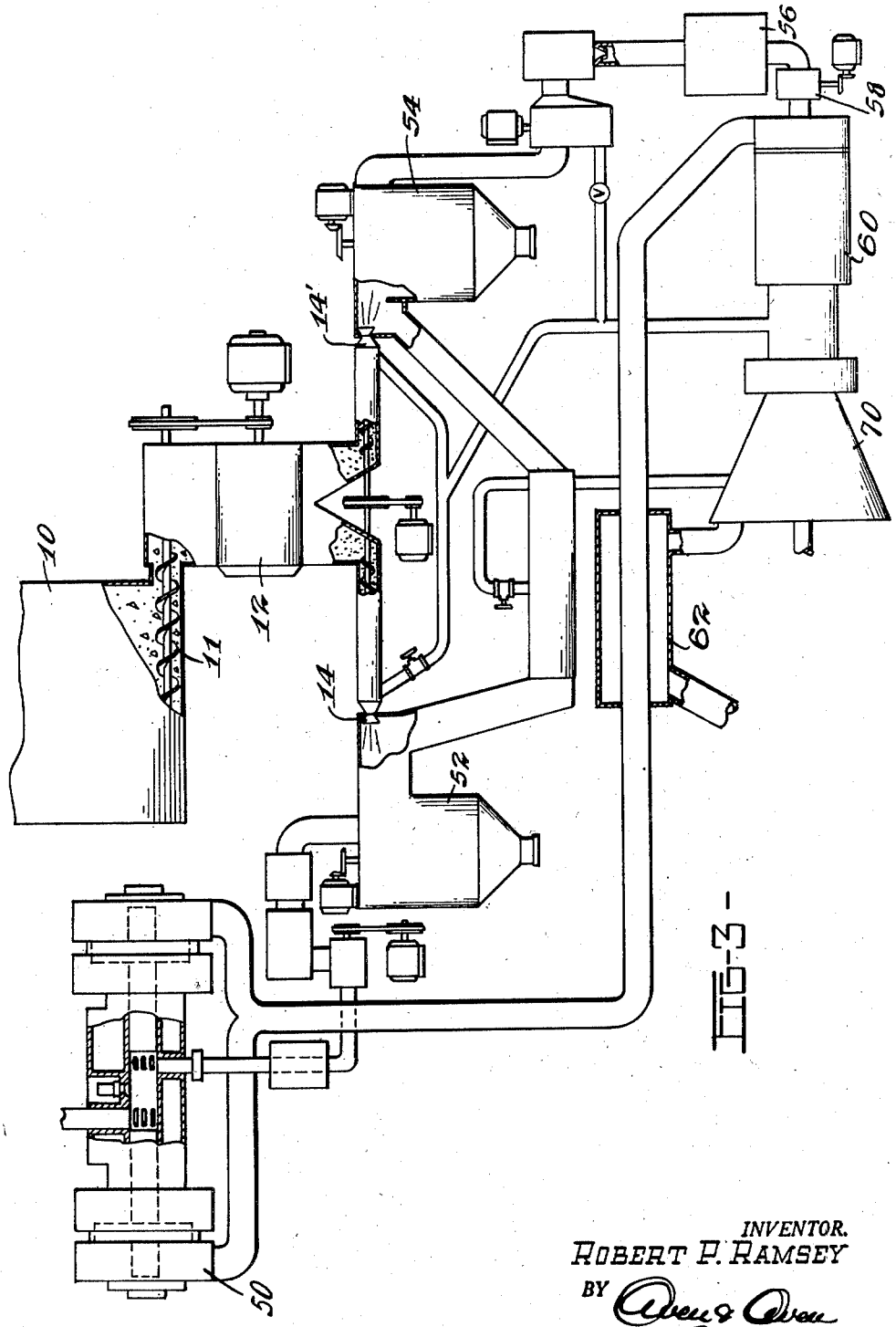
INVENTOR.
ROBERT P. RAMSEY
BY
Attorneys Patented May 30, 1950

2,509,246

UNITED STATES PATENT OFFICE 2,509,246

MEANS FOR DERIVING ENERGY FROM SOLID FUELS

Robert P. Ramsey, Hamilton, Ohio, assignor to Lima-Hamilton Corporation, Hamilton, Ohio, a corporation of Virginia Application September 20, 1946, Serial No. 698,323

4 Claims. (Cl. 60—11)

This invention relates to plants for the economical extraction of energy from solid fuels and is particularly directed to power derivation cycles utilizing a gas turbine or similar heat engine having a relatively high input pressure.

The primary object of the invention is to provide a thermal cycle for the derivation of energy from solid fuels which is characterized by very high thermal efficiency.

Another object of the invention is to provide a thermal cycle for the derivation of energy from solid fuels in which the combustible fraction of the fuel is converted to gas which is burned at high pressure and the high pressure and high temperature products of combustion are utilized in part in a gas turbine or similar heat engine while another part of the product of combustion is recycled to a gas extractor.

Still another object of the invention is to provide an apparatus in which gas, extracted from a solid fuel, is burned in a free piston machine operating either as a power gas generator or high output air compressor.

Other objects and advantages of the invention will become apparent from the following specification, reference being had to the accompanying drawings in which:

Fig. 1 is a diagrammatic view of an apparatus in which a free piston power gas generator is utilized to supply gas to a turbine as well as to a gas extraction unit; Fig. 2 is a diagrammatic view of a modified form of the invention in which a free piston compressor is utilized to supply high pressure air to a combustor in which combustion takes place at the pressure of the compressor output; and Fig. 3 is a diagrammatic view of an apparatus in which a separate gas producing unit is provided for a free piston compressor, and a separate unit for a main high pressure combustor.

Referring to the drawings, and particularly to Fig. 1, the invention is shown embodied in a cycle requiring for its execution only elements known in the art. As there shown, a solid fuel bunker 10 is provided with a mechanical feed 11 to a crusher 12 in which the fuel is reduced to a finely divided or powdered state. Such powdered coal is commonly burned under power plant boilers. In the present apparatus, however, the powdered coal itself is not burned, but is forced at high pressure through an orifice 14 and expanded in an inert atmosphere at an elevated temperatre in a cyclonic gas extraction unit 15. The expansion reduces the particle size of the coal still further to an impalpable powder and the elevation of the temperature is such that the combustible constituents of the coal are changed from the solid to a gaseous phase. Heat is supplied to the powdered material as hereinafter described. The incombustible constituents pass off as dust at the bottom of the cyclonic unit 15 where removal may be made periodically in any known manner. The cyclonic extraction unit 15 is known in the art as an efficient means to extract gas from coal, and the introduction of coal into such a unit in a manner tending to expand and distintegrate the coal particles by sudden pressure release is likewise known. If desired, however, other forms of gas producers may be utilized in the combination, the devices shown being simply the preferred forms.

Gas from cyclonic extraction unit 15 is taken to a second ash separator 16 in which all remaining solid particles are removed so far as possible. The gas is then lowered in temperature by a cooler 17 and raised in pressure by a booster pump 18 driven by a motor 19. It is then again cooled and fed as fuel gas to a power gas generator 20 which is preferably a free piston unit operating on a combined gas-Diesel cycle. Free piston power gas generators are known in the art and are highly efficient devices for supplying power gas to such heat engines as turbines or reciprocating engines operating at high pressure and temperature. Air required for combustion of the fuel in the free piston unit is compressed by the unit itself so that energy losses at this point are very low.

The power gas from free piston generator 20 is led at temperatures in the order of 1200° F. to 1500° F. and pressures ranging from 80 pounds to 120 pounds to heat engine, shown here as gas turbine 22. The energy contained in the power gas is efficiently converted to mechanical energy in turbine shaft 24 and may thus be used wherever desired, for example, as driving power for ar electric generator (not shown).

The power turbine exhausts near atmospheric pressure through a duct 25. Prior to exhaust the turbine is bled by a line 26 to supply secondary charging gas to the cyclonic extraction unit 15. The pressure in line 26 may be controlled by a valve 27 since line 26 is expanded in volume between valve 27 and cyclonic unit 15 and the pressure in the expanded portion of the line will depend on the volume of flow past valve 27. Preferably the charging gas to the cyclonic extraction unit is at a pressure of about 5 pounds, sufficient to act as a supporting medium and carrier for the fuel particles during the conversion of the combustible elements to gas.

A portion of the power gas produced by free piston unit 20 is taken through conduit 30 to be used as primary charging gas for the cyclonic unit 15 for the purpose of introducing powdered coal at high pressure. The hot compressed gas from conduit 30 blows the powdered coal through orifice 14 at high velocity and at high pressure. The sudden reduction in pressure within the cyclonic unit 15 expands and disintegrates the particles in the inert atmosphere of burned gas from conduit 26 which gas thus acts as a carrier for the impalpable coal particles during gasification.

Since the heat required for gasification and the pressure necessary properly to inject the powdered coal are both derived from the power gas, no appreciable energy is wasted in the operation, such energy being largely recovered by increased yield of the gas extraction unit.

In the form of the invention just described, combustion of the extracted gas takes place at high pressure in the cylinder of the free piston power gas generator. In the modifications shown in Fig. 2 and 3, the main volume of extracted gas is burned in a stationary combustor at high pressure in the presence of high pressure air supplied by a free piston compressor. In Fig. 2, a portion of the extracted gas, after being cooled and compressed in booster pump 18, is fed to a free piston compressor unit 40 operating preferably on a gas-Diesel cycle. The air output of compressor 40 is heated in a heat exchanger 42 by its own exhaust gases and taken to a stationary combustor 44 where it is utilized to burn the remainder of the extracted gas which enters through a conduit 46 from the booster pump 18. From the combustor the major portion of the power gas enters turbine 22, but a minor part is diverted through conduit 47 for use as charging gas in the gas extraction system. Secondary charging and particle supporting gas at low pressure is again taken from the turbine through a conduit 48.

Instead of diverting a portion of the output of a single gas extraction unit as shown in Fig. 2, a separate, smaller system may be used to furnish gas for the operation of the free piston compressor as shown in Fig. 3. As there indicated, free piston compressor 50 is provided with operating gas from an extractor 52, cleaned and raised in pressure in the same manner as shown in Fig. 1. Fed from the same coal crusher is a second gas extraction unit 54 the gas from which is given its thorough cleaning in a second cyclonic separating unit 56, boosted in pressure by pump 58 and fed to combustor 60. Air for the combustor is taken from the free piston compressor 50 after passing through a heat exchanger 62 where its temperature is raised by heat transfer from the exhaust gases of the free piston compressor. Again the heat and pressure required for the disintegration of the powdered coal is taken from the output of combustor 60 prior to its entrance into the turbine (here designated 70) and the inert gas required to carry and support the coal particles during extraction is taken from the turbine just prior to exhaust.

While the invention has been described in connection with particular embodiments thereof, it should be expressly understood that it is capable of numerous modifications and changes without departing from the scope of the appended claims.

Having thus described my invention, what I claim as new and desire to secure by United States Letters Patent is:

1. The combination of means for deriving energy from solid fuel which comprises, means for reducing the solid fuel to a finely divided state, means to place the finely divided fuel particles under pressure, means to extract substantially all of the combustible fraction of the fuel as gas in an inert hot atmosphere, means to raise the pressure of the extracted gas, means to burn said gas at its elevated pressure, a heat engine driven by the major portion of the products of combustion and means to divert a minor fraction of the products of combustion and utilize it in said means to place the finely divided particles under pressure prior to gas extraction.

2. The combination of means for deriving energy from solid fuel which comprises, means for reducing the solid fuel to a finely divided state, means to place the finely divided fuel particles under pressure, means to extract substantially all of the combustible fraction of the fuel as gas in an inert hot atmosphere, means to raise the pressure of the extracted gas, means to burn said gas at its elevated pressure, a heat engine driven by the major portion of the products of combustion and means to divert a minor fraction of the products of combustion prior to entry into the heat engine and utilize it in said means to raise the pressure of the fuel particles prior to gas extraction, and means to recycle a portion of the medium from said heat engine to act as said inert atmosphere and as a carrier for the expanded fuel particles during gas extraction.

3. The combination of means for deriving energy from solid fuel which comprises, means to reduce the solid fuel to a finely divided state, means to place the finely divided fuel particles under pressure, means to extract substantially all of the combustible fraction of the fuel as gas in an inert hot atmosphere, means to raise the pressure of the extracted gas, an internal combustion engine driven air compressor utilizing a portion of said gas as fuel, means to burn the balance of said gas at its elevated pressure by combination with the output of said compressor, a multi-stage gas turbine utilizing the major part of the products of combustion, means to divert a minor fraction of the products of combustion to said means to raise the pressure of the fuel particles prior to gas extraction, and means to remove gas from an intermediate stage of the turbine and to recycle said removed gas to act as an inert carrying atmosphere in said gas extractor.

4. The combination of means defined in claim 2 in which said means to burn said gas at its elevated pressure includes a free piston power gas generator.

ROBERT P. RAMSEY.

REFERENCES CITED

The following references are of record in the file of this patent:

UNITED STATES PATENTS

| Number | Name | Date |
|---|---|---|
| 1,795,670 | Odell | Mar. 10, 1931 |
| 2,184,845 | Noack | Dec. 26, 1939 |
| 2,447,124 | Kalitinsky | Aug. 17, 1948 |